G. Stackpole,

Auxiliary Power for Sewing Machine.

N° 82,655. Patented Sep. 29, 1868.

Witnesses
Frank L. Tinker
George O. Williamson

Inventor
Greenleaf Stackpole

UNITED STATES PATENT OFFICE.

GREENLEAF STACKPOLE, OF NEW YORK, N. Y.

IMPROVEMENT IN AUXILIARY POWER FOR SEWING-MACHINES.

Specification forming part of Letters Patent No. 82,655, dated September 29, 1868.

*To all whom it may concern:*

Be it known that I, GREENLEAF STACKPOLE, of New York city, in the county and State of New York, have invented a new and valuable Improvement for the application of Power to the Sewing-Machine as an Auxiliary; and I do hereby declare that the following is a full and exact description thereof, reference being had to the accompanying drawings, and to the letters of reference marked thereon.

The nature of my invention consists in providing an auxiliary power for sewing-machines, to assist the operator, by augmenting or multiplying the power applied to the treadle in the ordinary manner.

The object of my invention is to reduce the labor of running sewing-machines to the lowest point compatible with the perfect government of the movements of same by means of the treadle, operated in the ordinary manner; and while always necessarily insufficient in itself to propel the machine, and entirely subordinate to and under the control of the treadle, my auxiliary, by multiplying the power applied to the treadle, will perform about nine-tenths of the actual work of running the machine, leaving only about one-tenth of the power otherwise required (just enough to secure perfect control of the movements of the machine) to be exerted by the operator, thus rendering it an exceedingly valuable assistant to all who use sewing-machines, and especially, in a hygienic point of view, to ladies of delicate constitutions, who would thereby be enabled to use the sewing-machine with perfect ease and comfort, and without any danger of suffering the deleterious effects on health heretofore attending its use. It would, moreover, be an invaluable aid to all persons learning the use of sewing-machines, as it would not only render the machine very easy to operate, but would entirely prevent it from running backward unless desired by the operator, when, by simply touching a lever, the power can be instantly disconnected or connected at will.

Figure 1:
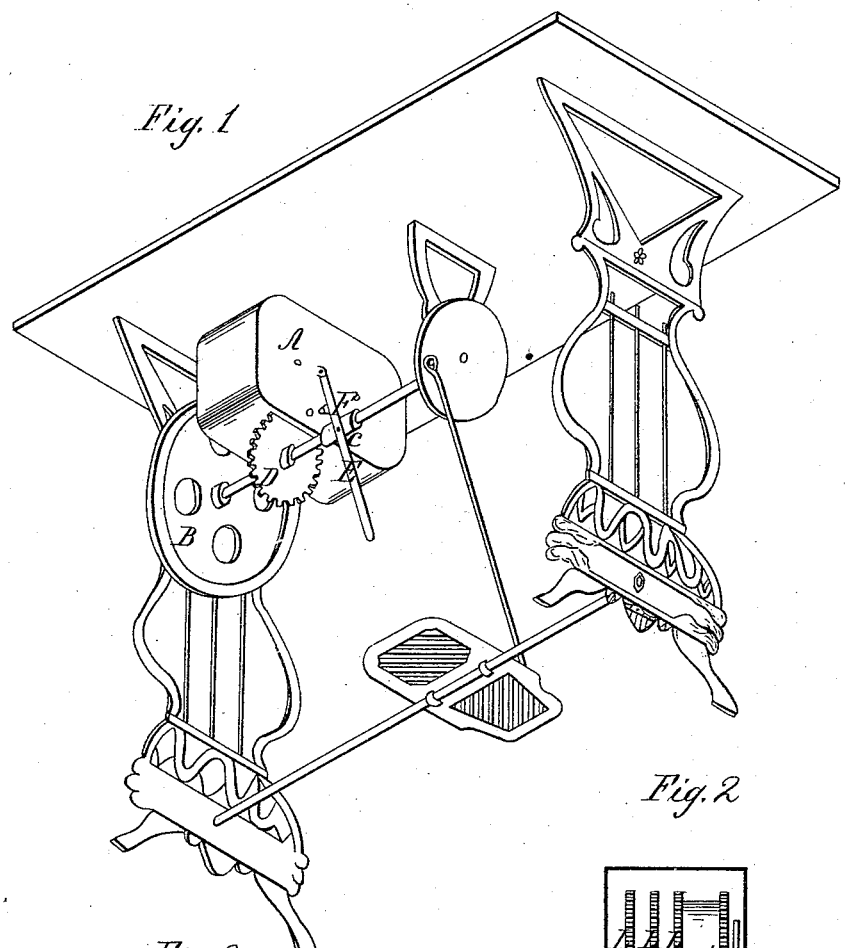

In the accompanying drawings, which are a part of this specification, Figure 1 is a side elevation of a sewing-machine with my invention attached, in which $a$ is the case containing the machinery necessary for my power. $b$ is the balance-wheel, which is the same as in machines without the power attached. $c$ is a clutch, which slides on the main shaft, but cannot revolve. $d$ is a pinion which gears into one of the wheels inside of the case $a$, said pinion $d$ being loose on the shaft except when in contact with the clutch $c$. $e$ is a lever which is fastened to the clutch by a band in such a manner as to allow the clutch to revolve, the opposite end of said lever being attached to the case $a$. Said lever also has an arm, $f$, which comes in contact with the gear and stops it when the clutch is moved away from the pinion $d$.

Figure 2:
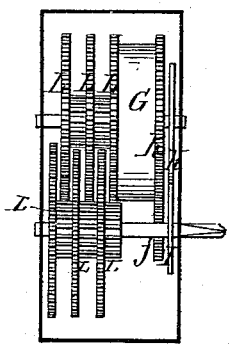

Fig. 2 is a side sectional view of my invention, in which $g$ is a drum containing a spring. $h$ is a ratchet. $i$ is a stop-gear to prevent the spring being wound too hard. $j$ is a pinion geared into the winding-wheel $k$ for the purpose of gaining power in winding the spring. The wheels $l\ l\ l\ l\ l\ l$ are gear-wheels, having pinions attached and connected with each other in the manner of clock-wheels for the purpose of gaining speed.

Figure 3:
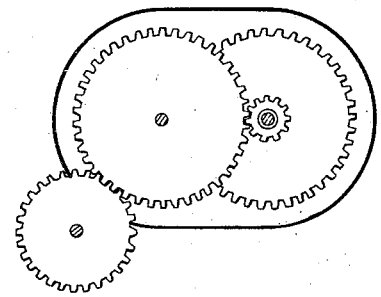

Fig. 3 is an end view, showing the connection of the pinion with the gearing inside the case.

Having thus described my invention, what I claim as new, and desire to secure by Letters Patent, is—

The application to the sewing-machine of an auxiliary power, when used in conjunction with and controlled by the treadle worked in the ordinary manner, to assist the operator, substantially as and for the purpose set forth.

G. STACKPOLE.

Witnesses:
 JOHN F. FULLER,
 CHAS. W. IRVING.